United States Patent
Foster, Sr.

(10) Patent No.: US 6,234,267 B1
(45) Date of Patent: May 22, 2001

(54) EARTH ANTI-TWIST APPARATUS FOR REACTIVE MACHINES/ SAVES ENERGY

(76) Inventor: Richard Ellis Foster, Sr., 13849 Reed Ave., Baton Rouge, LA (US) 70818-2936

( * ) Notice: Subject to any disclaimer, the term of this patent is extended or adjusted under 35 U.S.C. 154(b) by 0 days.

(21) Appl. No.: 09/436,380

(22) Filed: Nov. 9, 1999

Related U.S. Application Data

(60) Provisional application No. 60/109,760, filed on Nov. 25, 1998.

(51) Int. Cl.$^7$ ................................................. B60K 8/00
(52) U.S. Cl. ......................... 180/300; 180/291; 248/607; 310/51; 310/91
(58) Field of Search .................... 248/607, 648; 310/51, 91; 123/192.1, 192.2; 180/291, 300

(56) References Cited

U.S. PATENT DOCUMENTS

| | | | |
|---|---|---|---|
| 1,000,494 | * 8/1911 | Clement | 123/192.1 X |
| 1,600,071 | * 9/1926 | Shaifer | 73/862.09 |
| 1,638,782 | * 8/1927 | Paton | 123/192.1 |
| 1,790,159 | * 1/1931 | Leland et al. | 248/607 |
| 1,819,665 | * 8/1931 | Wiltse | 192/192.1 X |
| 1,925,036 | * 8/1933 | Gorton | 474/114 |
| 2,198,863 | * 4/1940 | Corey et al. | 310/91 |
| 2,211,108 | * 8/1940 | Gerald | 73/862.8 |
| 2,934,297 | * 4/1960 | Mitzl | 248/607 X |
| 3,667,706 | * 6/1972 | Tiberghien | 123/192.1 X |
| 4,161,667 | * 7/1979 | Buckman et al. | 310/51 |
| 4,200,426 | * 4/1980 | Linnert | 310/51 X |
| 4,693,217 | * 9/1987 | Beer | 248/559 X |
| 4,856,156 | * 8/1989 | Link et al. | 492/7 |

FOREIGN PATENT DOCUMENTS

| | | | |
|---|---|---|---|
| 456187 | * 11/1936 | (GB) | 248/607 |
| 105974 | * 9/1963 | (NL) | 310/51 |

* cited by examiner

*Primary Examiner*—Allan D. Herrmann

(57) ABSTRACT

These apparatuses consist of devices and systems to conserve energy in action/reaction processes. Instead the excess current drawn when accelerating motors to move the earth will be omitted as a result of the starting operation. Generators, machinery, and vehicles will be more efficient and less polluting. This is done by means of a counter weight, spring means, or a brace and for stationary and moving systems. For cars, trains and other vehicles, a strong static spring further extended by a counter weight/gravity or external cable opposing the backward travel of the travel media will be effective. Braking may be complemented by deflecting a strong spring which allowed to expand to resume travel.

1 Claim, 5 Drawing Sheets

//EARTH ANTI-TWIST APPARATUS FOR REACTIVE MACHINES/ SAVES ENERGY

This application claims benefits of Provisional Appl. No. 60/109,706, Nov. 25, 1998.

This invention describes and illustrates apparatus which can be used to improve efficiency, lower pollution and in some cases reduce costs of associated materials and labor. These examples of apparatus improve action/reaction processes both moving and stationary Energy related to both linear motion and rotary motion will be saved by stopping the twisting by the reaction that waste energy There are reference patents cited as prior art which use similar parts namely Linnert, Leland et al, Buckman et al, Mitzl and Corey et al, Clement, Link, Paton, Gorton, Tiberghien, Beer, Wiltse, Pinchon, and Maschinenbau et al. While these appear to be useful for other purposes, they neither prevent nor claim to prevent wasting energy when reaction on acceleration or deceleration by the reaction albeit an infinitesimal amount each occurrence.This application consists of an antitwist counterweight directly or with springs, brace or cable to adjust tihe welylil distribution of any machine or vehiclc like weighing something on a scale to prevent the motor or machine or vehicle from reacting to move the earth. This is an attachment or system to use on a case by case basis to Save Energy and reduce wear of roads and tires and lower Pollution etc.

Claims include: A reaction control system comprising a motor; a motor housing; a weight; said weight mounted on said motor housing; when said motor accelerates in one direction, said housing tends to twist in the opposite direction because of counter reaction torque; said weight mounted on said motor housing so as to tends to zero out the effect of counter torque twisting on said housing when said motor accelerates.

DESCRIPTION OF RELATED ART

Great strides have been made in recent years in energy fields and transportation means as well as most other varied fields of endeavor. Vehicles are getting better, safer, and more energy efficient. The concern for air emissions from industry as well as by mobile sources as monitored by EPA is ever in the forefront. The Big Three had been asked to come up with an 80 automobile in the interest of fuel conservation and lowering pollution.

As a retired engineer, this applicant is also concerned with the improvements to reduce the rate and extent of maintaining our deteriorating highway, road and street systems. Statistics show that one 18-wheel truck can cause as much deterioration to our pavement as 9600 automobiles.

This invention describes apparatus that will help solve problems to save money that can be used to improve our travel facilities, education, health, and infrastructures etc The apparatus related in this application can also further reduce wear and tear on our highways and cut pollution further. These dollars will help build new roads to relieve congestion and reduce site pollution and pollution in general.

Prior art cited for this invention:

| 1. 4/80 | Linnert | 4,200,426 | 310/51 (XR) |
| 2. 1/31 | Leland et al | 1,790,159 | 248/607 |
| 3. 7/79 | Buckman et al | 4,161,667 | 310/51 |
| 4. 4/60 | Mitzi | 2,934,297 | 248/607 (XR) |
| 5. 4/40 | Corey et al | 2,198,863 | 310/91 |

BACKGROUND OF THE INVENTION

Technical Field

The field of endeavor of this invention includes action/reactions and their effect in ever moving planet earth or other bodies. deals with stationary actions and mobile source actions that was energy when they react on earth and ways to neutralize these ant onserve energy by harnessing reactions. This is a sequel to U.S. Pat. No. 5,685,196 which is for reactive propulsion systems. It describes means for a craft or vehicle to interact with movable weight(s) rather than on the earth. These systems are applicable for installation or new vehicles generally. This concept involves propelling the vehicle as well as an option in braking and in some cases steering the vehicle. Since the roadways pavement would not be subjected to the poundings when accelerating and also drag when conventionally braking that they currently receive, they should last much longer and stay in optimum condition. This will protect the roadways and also the vehicles that traverse them.

But this invention is applicable to modifying existing vehicles of most all sorts to be more efficient and less polluting. This concept is also applicable to stationary electric motors, gas and diesel engines, factory and other machinery which start and stop operation. Almost all of these react on the earth when accelerating and decelerating and absorb and waste energy. These devices'reactions tend to move the earth infinitesimal amounts thus consuming about one-half the input energy that is applied. This force on the earth sets up a twist which now can be avoided in many cases. It is virtually blocked and no longer consumes energy by setting up a countertwist with a counter weight or spring. Thus the energy is all directed toward the specific task at hand i.e. the action. Several examples of this useful process are described in this application. Less fuel used and less pollution will then be realized. Prices of fuel will be adjusted accordingly so that energy companies will continue to prosper and the life of all energy reserves will be extended in the future.

SUMMARY OF THE INVENTION

As described in the background, this invention describes ways to block the effect of reactions which ultimately move the earth an infinitesimal amount each occurrence. These ways involve the equivalent of springs and counter weights to produce a counter twist to shut off the flow of wasted energy. This is accomplished by confronting the reactions at their source with an equal and opposite force from a potential but static energy spring or counterweight. This appears to be simple and straightforward and much less controversial than was U.S. Pat. No. 5,685,196.

BRIEF DESCRIPTION OF THE DRAWINGS

There are many specific examples of apparatus possible wisth this invention. But since they all involve counter measures such as weights or springs etc. to prevent wasting energy with reactions to move the earth, only three examples are shown.

DESCRIPTION OF DRAWINGS

Figure 1A:
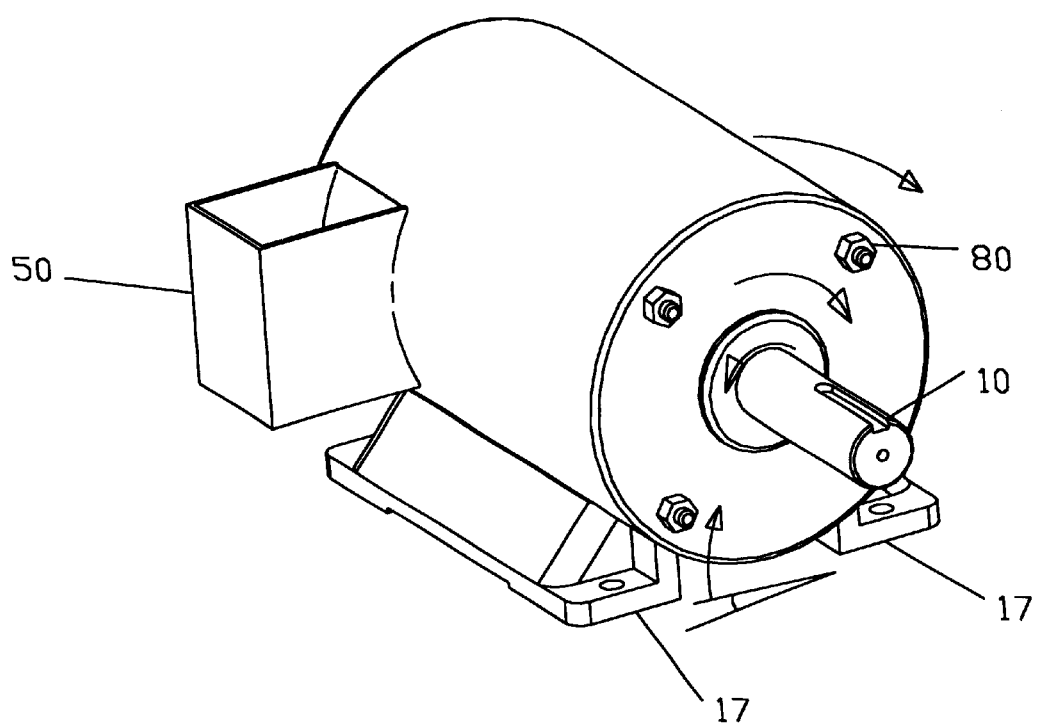
FIG. 1A shows am electric motor 10 or generator 10 with a static counter weight 50 on 'light' side when accelerating.
Figure 1B:
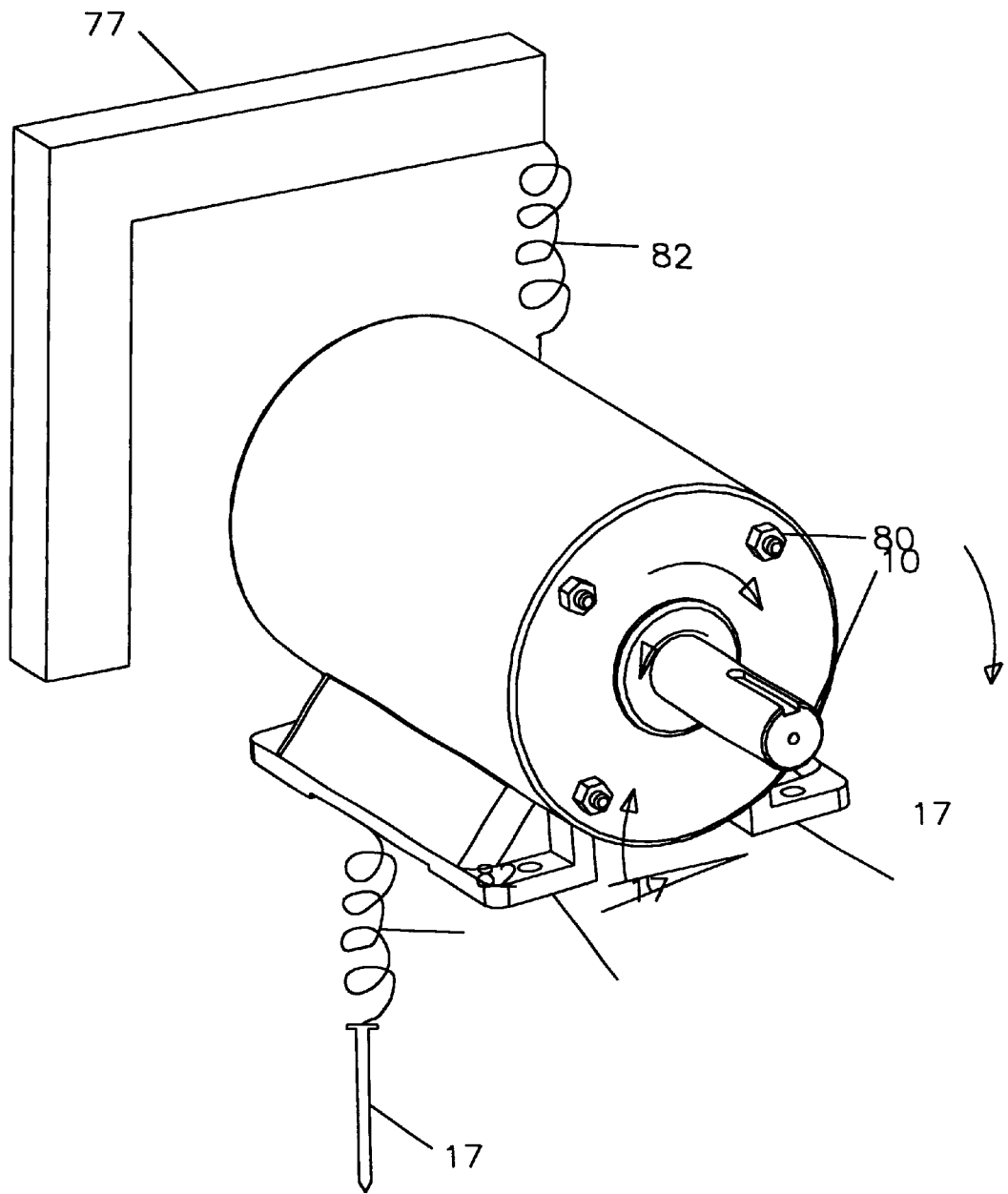
FIG. 1B likewise with a spring means countertorque on "light" side or can use a cantilever 7 from the "heavy" side.
Figure 2:
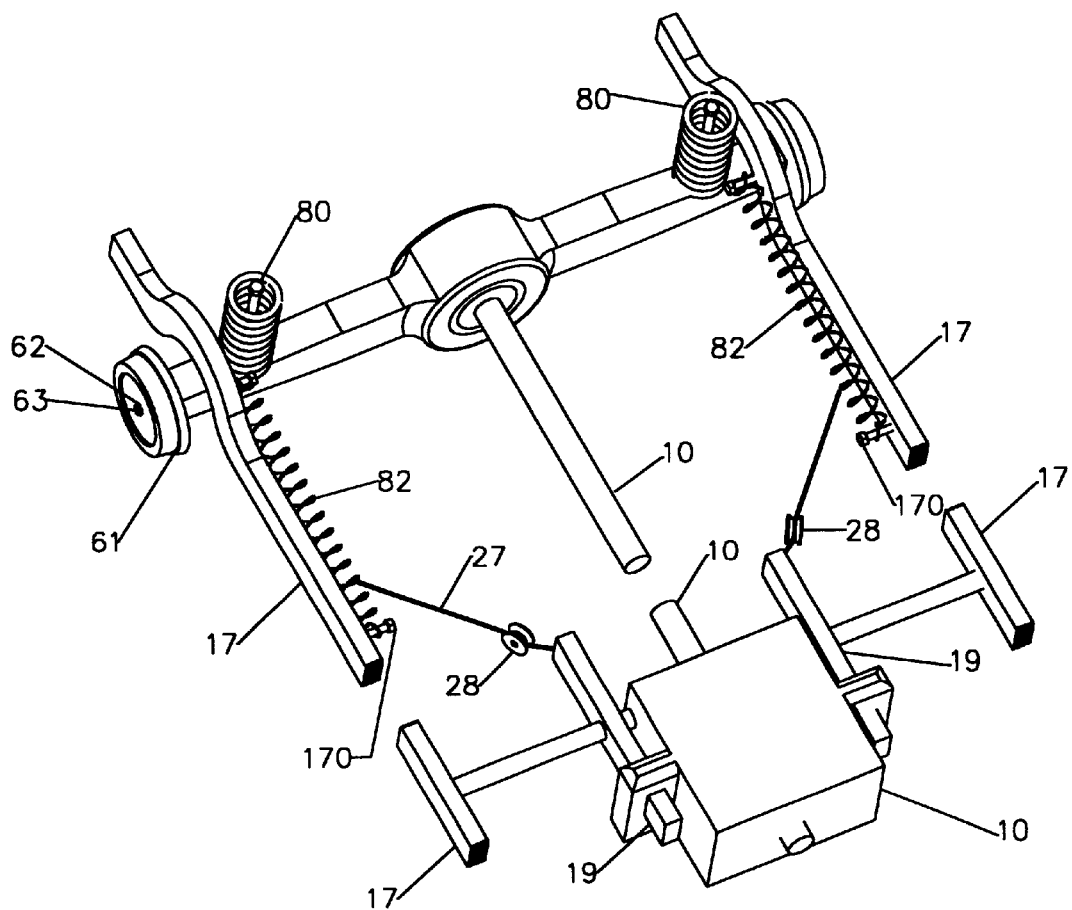
FIG. 2 shows the driving wheels of a vehicle with a counter spring means 82 extended by a counterweight 50 on arm 19, cable 27 and pulley 28.

There are many examples of motors, generators, engines and machinery wasting energy needlessly. Energy is further neddlessly expended in travelling about on Planet Earth by accepting that reaction was a natural consequence of action. Otherwise the ultimate limit of 100 off iciency wag only 50%. Jets and rockets as wall as air and water props react on the travel media which is energy robbing. To further conserve energy could presumably be done in a somewhat similar manner as for land vehicles. A jet, rocket, plane or boat can have strong static springs usually extended by a counterweight/gravity e.g. to an open cylinder or nozzle. It is however conceptually more difficult to harness these effluent media than with e.g. a wheel resting on the roadway. Perhaps, this means that in these more difficult conditions, the best way is to propel and brake as wall as in Anme cases to steer, by means of reaction upon weight systems. FIG. 1A shows an electric motor or generator or machinery in general 10, whether stationary or mobile which uses one or sore counter weights 50, to nullify any tendency for twistinq of the earth. Existing units 10 can be calibrated by checking the apparent weight at the mounts 17 at rest. Then while starting these apparent weights can likewise be measured and the difference be calculated. By this means, an appropriate counterweight value can be determined. This is the method also to be used for counter twist springs 82 or braces 170 or simply to torque in enough counter stress. The counter weight 50 can be on arms to the "lighter" side or can be done by cables 27 and pulleys 28 on pivoted arm 19 to the heavier side when accelerating. The light side is the side that tends to lift up when motor accelerates while the heavier side tends to press down more. But for new equipment this weight distribution can be designed-in as built at the factory. But for electric motors and engines 10 for trains and other vehicles, counter springs 82 would likely be preferred. The springs can be coil springs covered by a sheath for safety for FIG. 1B as well as the ones in FIG. 2. On the other hcnd, FIG. 2 represents a spring system 82 for cars, trucks, and other vehicles. For example, a static but partially stretched coil spring 82 extended by a counterweight 50/gravity can be attached from the frame rail 170 if on front wheel drive to low on the wheel suspension 17. This can have up to 100 lbs. pull or more(no upper limit) to force the axle 63 to closer proximity to the front of hub 62. This will insure that in accelerating, the reaction normally to the pavement is also applied to the front of the hub as is the action component. Thus higher acceleration of the vehicle itself will be realized. For braking, with or without the other deflection spring 85 as in FIG. 3, the twist on the earth is in effect and helps dissipate energy in braking. But for acceleration greater than for the static preset spring (can be adjustable), reaction to the pavement 16 can occur. The bottom portion of a tire flattens 61 and at the source of the reaction to the pavement 16. Thus the spring 82 although it is not directly connected to the tread,may behave and function as though it were. As the flattened tire 61 rolls, it always presents a new portion to the roadway 16 and inhibits kicking back. Roads and tires will last longer and pollution much lesser. The simplest scenario for this spring means is for the rear wheels of a rear wheel drive vehicle. The spring 82 is further stretched by a counter weight 50 as effected by gravity or by external cable 27 as per FIG. 2.

Figure 3:
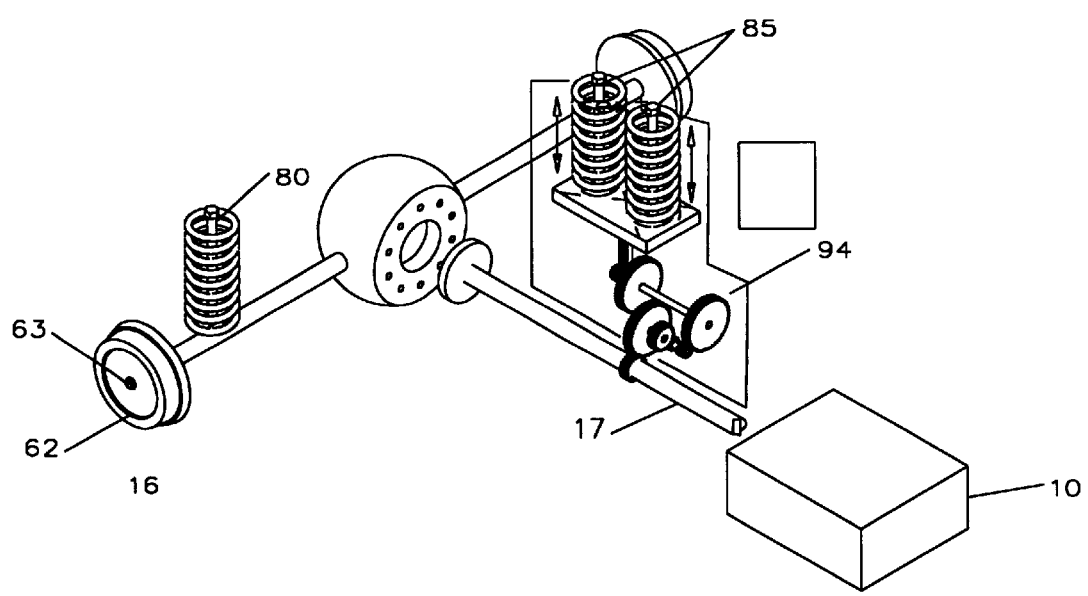
FIG. 3 depicts a spring means 85 system to deflect, storing energy on braking that is utilized in resuming travel.

FIG. 3 shows a sketch of the apparatus proposed for saving energy on braking by deflecting spring 85. It can be comprised of several heavy duty leaf springs 85 in series if desired. When stopping, this f irst slows the drive shaft 18 by geared 94 deflection of the springs according to the available stopping distance and the urgency involved . This is instead of using the motor 10 to brake. These have conventional hydraulic brakes as secondary back up options. This stored energy by the deflected springs 85 is then drawn down by in/out gear box 94 to resume travel.

DETAILED DESCRIPTION OF THE INVENTION

The apparatus to conserve energy during start up of stationary electric motors, generators, reactive machinery including oil and water well drilling rigs are also applicable for land vehicles. These include cars, trucks, train engines as well as many other vehicles such as tractors, earth movers, plowing and cultivating and the like. Even for braking, these systems may not need to be bypassed during deceleration as this also moves the earth which is productive when stopping. Vehicles may need conventional brakes as a back up system but considerable kinetic energy can be stored during braking allowing it to deflect another set of strong springs 82 as in FIG. 3. This potential stored energy can be reused to resume subsequent travel. In series resistance and capacitors may not be required with both stationary and mobile uses of electric motors and generators. Traditionally, motors draw twice as much electricity to start and accelerate. This actually wastes half of this energy output to twist the earth. While this may be of little consequence in one respect, it nevertheless wastes power. This is especially manifest over periods of time of start and stop, varying loads and speeds and the inherent drag that occurs.

All of the above examples relate to action/reaction devices both stationary and in motion along with apparatus to conserve energy and reduce pollution. Roads, tires, alignment and vehicles will all last longer but albeit not as much as with propulsion and braking using weights as per U.S. Pat. No. 5,685,196.

Figure 1C:
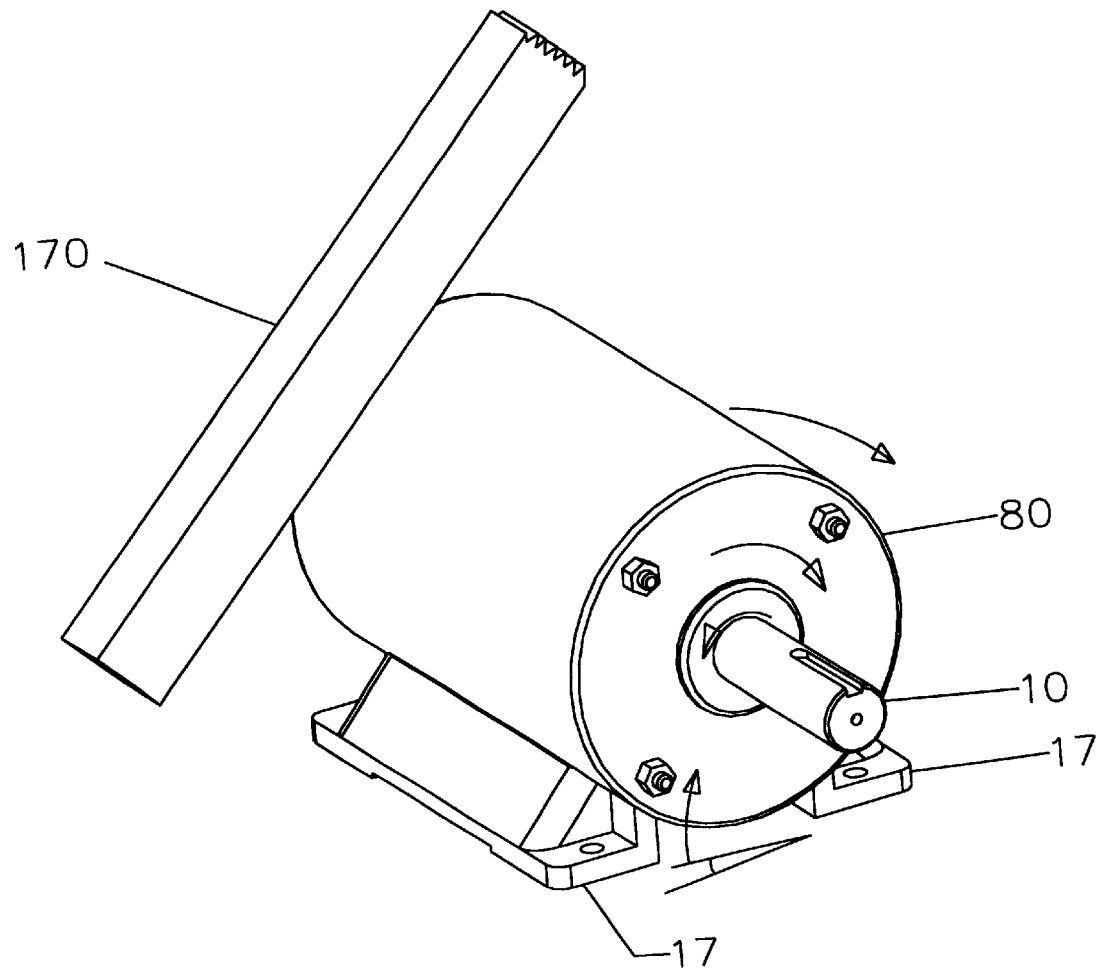
FIG. 1C shows a strut 170 applied to the motor or machine 10.

An electric motor 10 as in FIG. 1 can have the twist produced by acceleration countered or neutralized by an opposite twist. This can be done by torgueing in however much opposing strain to counter the twist of starting up. This can also be accomplished by a counterweight 50 e.g. on an arm, or else a spring 82 properly used. It will be found in many cases that starting resistance used in series nor capacitors may not be needed to limit current flow. This may be useful in both stationary motors, engines and machines and moving vehicles.

For land-based vehicles on the road or rail it may be noted that the source reaction upon the pavement always relates to the bottom of the flattened, powered rolling tire or wheel. Hence it became apparent that a heavy duty stretched spring 82 connected from below the axle to the frame 170 near the bumper might resist this reaction. This stretched spring further stretched by counterweight and gravity at least partially equivalent to this linear reaction should impede this twist which would otherwise move the earth a bit, but enough to consume half the total energy. It also should hold the powered axle in close proximity to the associated frontal half of the hub. This being the case shuts off the reaction and permits smaller engines and less fuel consumption, smaller fuel tanks and less pollution. Kits will become available to franchised shops to retrofit to existing vehicles. New vehicles and motors can be designed to have anti-twist counterweights or else springs an integral part of the vehicle or motor when built at the factory. The reaction comes in to play when vehicle moves and especially when it exceeds the amount countered by the stretched spring on each driving wheel. Every vehicle, motor and machine is a separate entity with its own efficiency at stake. There can be an excess of counter twist since this does not require any power. Also, one can use levers to increase the force from smaller springs. With motors or machinery, the apparent weight on motor mounts at rest can be measured and modified with weights or springs to zero out the effect of typical start and acceleration by the necessary means. It is possible to use springs or weights to counter stress intervals or sections of roads or race tracks and stabilize them.

Plowing and cultivating and earth moving may in addition to providing counter twist on the motor be done more efficiently by a different technique. This consists of using a drag-line and cable or else have an arm to permit pulling the plows toward the tractor at intervals and repeat. It could also be done by plowing away from tractor. Thus the tractor through its wheels on the ground, sets up an opposing force or counter twist to cancel that of the twist from accelerating the plow. Likewise other examples are drilling rigs for oil or water wells.

For new vehicles it may be better to design and provide support slots for the driving wheels axles where there is more play for attaching the impedance springs than provided on existing vehicles. In any event this sets up opposite forces to the ones produced by acceleration in the rearward direction which otherwise would waste energy. The same feature will be used with a liner for a sleeve for attaching a static spring for use with props for boats and planes or for jets and rockets. This should allow most of the reaction as well as the action to propel these crafts. The efficiency should be much greater and pollution correspondingly lower.

In general, it should be feasible to both limit the amount of wasteful twisting of the travel media as well as the earth. By means, herein described this can be done for the engines as well as for the propulsion means. The counter twist can be provided by many ways including a static hydraulic or pneumatic piston and cylinder or even provided by the weight of the vehicle(s). Many kinds of vehicles can have neutralization of the twist on the earth directly or via the travel media. This involves separate counter measures for the motor or engine and for the remainder of the craft or vehicle.

FURTHER EXPLANATION

In the months after filing the provisional application, confirmation of the methods to prevent wasting energy was made by experimental work. For example as in FIG. 2 showing a moving vehicle, the springs must be further stretched by external force. Whereas the initial way did hold the hub and axle closer together, it wasn't enough. Clamping on and further stretching the spring(s) using a cable and an external force such as gravity as in FIG. 1 to a counterweight or else a tow cable is needed. This extends the counter twist on down through the tires and pavement.

It was found that in motion, the vehicle itself no matter where the spring(s) is attached, blocks the access of the counter twist to the earth. But when further stretched using an external force makes it an active spring which is effective to provide counter twist. This prevents moving the earth an infinitesimal amount when accelerating (or decelerating). Levers or other means permit using the weight of a portion of the vehicle e.g. the motor or else the weight of the driver for this purpose. Levers attached to these movable components such as the motor or driver's seat enable the further stretching of the spring(s). An alternative way can instead be done by means of a separate vehicle such as an external trailer.

For operation of an engine/generator system or any engine or motor and its load, usually no twisting of the earth occurs when running at constant velocity. In fact, it might be said that, in this case, the load is the antitwist. However when speeding up it tends to move the earth in one direction whereas it moves the earth in the opposite direction when it decelerates or stops. For some machines, having vertical or at angle moving components, the resultant force twist when changing speed will also tend to react on or twist the earth and waste energy. If stationary this may be neutralized directly with e.g. a spring or cable also attached to a fixed point on earth.

Some applications can have the twist tendency stopped by a counterweight placed at the "light" side(when accelerating). Likewise a cable or spring from above to a cantilever from the "heavy" side will be effective. Either of the above utilize gravity as the external force for moving machines. The twist tendency to the earth can be addressed for horizontal or sloping overall resultant for that machine.

Any change in surrounding mass such as shifting of cargo etc. may call for reappraisal of counter twist needed. There can be an excess of this as it doesn't require power. Other features such as the extent of concrete slabs etc. also affect the counterweight value needed. These variables all play a role and must be addressed on a case by case basis to at least maintain enough counter force.

It may be effective to have jet engines and rockets mounted in slots and use gravity where possible to have these components of a craft to further stretch a spring to liner or sleeve through which effluent gases passes. This may be more difficult for air, space and water crafts so it may be preferable to employ systems of reacting masses described in U.S. Pat. No. 5,685,196. The latter is much more efficient inherently For plowing and earth moving, the techniques of either pulling plow or blade toward tractor at intervals or else pushing away fram may be effective to conserve energy. This may help when changing speeds without wasting energy.

In general an appropriate counter twist measure is taken to counter the reaction when accelerating.

It can be noted that the modification of FIG. 2 is only an application of material already covered in the provisional patent as in FIG. 1. Accordingly no new material has been added in this application for a utility patent.

Universities teach that Reactions tend to move the Earth inversely proportional to their relative masses.

When accelerating a motor or machine, the housing tends tc, rotate or twist in an opposite direction from the rotor and therefore where horizontal or angular, one side of the housing tends to ture toward the observer and can be called the lighter side. The other side tends to turn away from the observer i.e. the heavier side. The remedy is to use Gravity and apply properly an anti-twist to cancel out this starting torque and save energy.

I claim:

1. A reaction control system comprising a motor or machine; a motor or machine housing; a weight; said weight mounted on said motor or machine housing; when said motor or machine accelerates in one direction, said housing tends to twist in the opposite direction because of counter reaction torque; said weight mounted on said motor or machine housing so as to tend to zero out the effect of counter torque twisting on said housing when said motor or machine accelerates.

* * * * *

UNITED STATES PATENT AND TRADEMARK OFFICE
CERTIFICATE OF CORRECTION

PATENT NO. : 6,234,267 B1
DATED : May 22, 2001
INVENTOR(S) : Richard Ellis Foster, Sr.

Page 1 of 1

It is certified that error appears in the above-identified patent and that said Letters Patent is hereby corrected as shown below:

Column 1,
Line 7, after the number "80", insert -- mpg --.
Line 19, delete "tihe welylil" and substitute -- the weight --.
Line 20, delete "vehiclc" and subsitute -- vehicle --.

Column 2,
Line 2, delete "wisth" and substitute -- with --.
Line 5, delete "was" and substitute -- waste --.
Line 6, delete "ant onserve" and subsitute -- and conserve --.
Line 6, delete "am" and substitute -- an --.

Column 3,
Line 3, delete "neddlessly" and substitute -- needlessly --.
Line 5, behind the 0 in 100 insert -- % --. (100%)
Line 5, delete "off iciency wag" and substitute -- efficiency was --.
Line 15, delete "Anme" and substitute -- some --.
Line 18, delete "sore" and substitute -- more --.
Line 19, delete "twistinq" and substitute -- twisting --.
Line 36, delete "hcnd" and substitute -- hand --.

Column 4,
Line 30, delete "torgueing" and substitute -- torqueing --.
Line 65, delete "f irst" and substitute -- first --.

Column 6,
Line 71, delete "tc" and substitute -- to --.
Line 73, delete "ture" and substitute -- turn --.

Signed and Sealed this

Second Day of April, 2002

*Attest:*

JAMES E. ROGAN
*Attesting Officer*     *Director of the United States Patent and Trademark Office*